March 21, 1933.　　　E. J. MACEY　　　1,901,973
LUBRICATOR FITTING
Filed Jan. 6, 1932
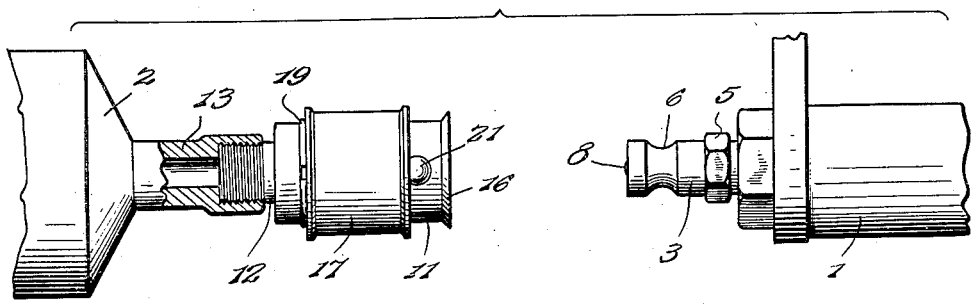
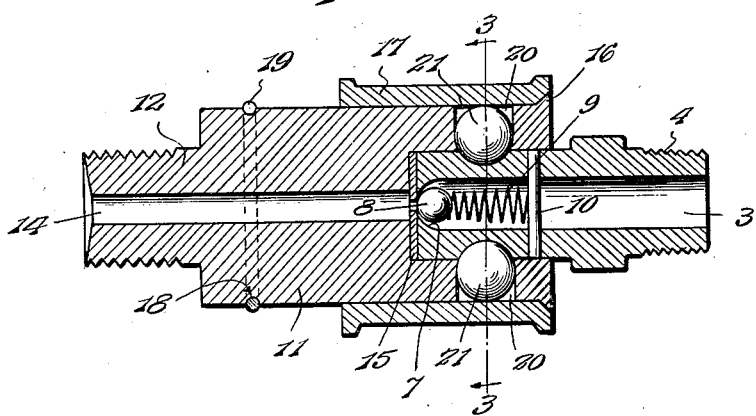
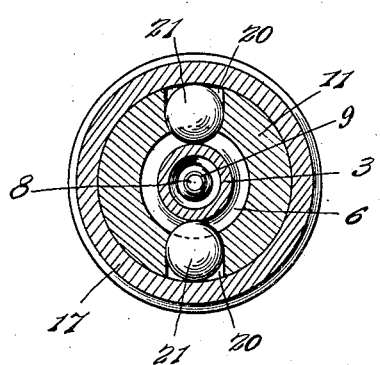
Inventor
E. J. Macey.
By Lacey & Lacey
Attorney Patented Mar. 21, 1933

1,901,973

UNITED STATES PATENT OFFICE

EUGENE J. MACEY, OF ROSHOLT, SOUTH DAKOTA

LUBRICATOR FITTING

Application filed January 6, 1932. Serial No. 585,117.

This invention relates to means for effecting lubrication of vehicle springs, bearings and other parts which are lubricated by the injection thereinto of heavy oil or grease by the use of a high pressure gun. The object of the invention is to provide fittings which may be applied to the springs or other parts to be lubricated and to the delivery nozzles of grease guns and which will be of such construction that the parts may be easily and quickly fitted together when lubricant is to be injected. Another object of the invention is to provide means whereby the inflow of the lubricant to the bearing or other part will not be interfered with but outflow of the lubricant from said parts will be prevented, and a further object of the invention is to provide means whereby the cooperating parts may be very easily engaged and locked together but may be easily separated when lubrication has been effected. The invention is illustrated in the accompanying drawing and consists in certain novel features which will be particularly pointed out in the appended claim.

In the drawing, Fig. 1 is an elevation, partly in section, of an apparatus embodying the invention and showing the interengaging fittings separated, Fig. 2 is an enlarged longitudinal section through the fittings showing them engaged and in position to permit lubricant to be injected, Fig. 3 is a transverse section on the line 3—3 of Fig. 2.

In the drawing, the reference numeral 1 indicates a portion of a vehicle spring, which is illustrated conventionally and by way of example, while the reference numeral 2 indicates a portion of a grease gun or lubricant injector which is also shown conventionally and may be of any known or approved form.

In carrying out the present invention, there is provided a tubular body or fitting 3 which is externally threaded at one end, as shown at 4, whereby it may be secured in a threaded socket formed in the spring or other part which is to receive lubricant, and adjacent said threaded end flat faces 5 are formed externally upon the body to be engaged by a wrench or other turning tool so that the tubular body may be turned home and be firmly secured. The end portion of the body 3, remote from the threaded end 4, is circular in contour and is provided with an annular grove 6 which is adapted to be engaged by locking elements when a grease gun is brought into position to deliver lubricant to the spring, bearing or other part. The bore of the body 3 opens through both ends of the same and, at its outer end, said bore has its walls converging to provide a seat 7 for a ball check valve 8 so that lubricant may be fed into and through the bore of the body but will be prevented from escaping therefrom by reason of the ball moving against its seat and effectually closing the opening therethrough. To yieldably hold the ball normally seated, an expansion spring 9 is provided within the bore of the tubular body 3 and an abutment pin 10 is fitted diametrically through the body, as clearly shown in Fig. 2, the spring bearing at one end against said abutment and at its opposite end against the ball valve so that the ball will be held to its seat and close the opening therethrough.

To cooperate with the fitting 3, there is provided a larger tubular cylindrical body 11 which, at one end, has a reduced portion or tenon 12 which is externally threaded and is adapted to engage the internal threads upon the delivery nozzle 13 of the grease gun. The bore 14 of the cylindrical body 11 is disposed centrally of the body so that it will aline with the bore of the tube 3 when the parts are engaged, as shown in Fig. 2, the bore 14 being somewhat less in diameter than the bore of the tube 3, as shown. At the outer end of the body 11, the bore 14 is enlarged so that it may receive the meeting end of the body 3 with a close fit, and a gasket or washer 15 of any suitable material may be interposed between the end of the body 3 and the base of the enlarged portion of the bore 14 to prevent leakage, said washer having a central opening to permit the passage of the lubricant, as clearly shown in Fig. 2. The body 11 is provided, at its outer end, with a marginal flange 16 which constitutes a stop for the locking sleeve 17 which is slidably mounted upon the body, as shown in Figs. 1 and 2. The outer end of the sleeve 17 is flared or beveled so as to fit closely to the stop flange 16 but the opposite inner end of the sleeve need not be beveled and is preferably formed so that its end surface will be disposed at a right angle to the surface of the body and will eliminate all gaps between the same. Adjacent its inner end, the body 11 is formed with an annular groove 18 which receives a split ring 19 of such diameter that it will fit closely and firmly within the groove to be held thereby and will project beyond the surface of the body 11 so that it will constitute a stop to limit inward movement of the sleeve 17. Adjacent its outer end, the tubular body 11 is formed with radial openings 20 which open at their outer ends through the side of the body and, at their inner ends, open into the enlarged bore thereof. These openings receive balls 21 of such diameter that they will be received easily within the openings 20 but will have a running fit therewith and, in one position, will project beyond the outer surface of the body and, in another position, will project somewhat into the enlarged bore of the same. In the latter position, which is shown in Figs. 2 and 3, the balls will seat in the annular groove 6 of the fitting 3 and will serve to prevent withdrawal of the latter from the body 11, the balls being held in such engagement by sliding the locking sleeve 17 to the outer end of the body 11 so that it will extend over the balls, as clearly shown in Figs. 2 and 3. If the locking sleeve be slid inwardly until it abuts the stop ring 19, the outer beveled end of the sleeve will be brought to a position inwardly of the balls but projecting over the same slightly, as will be understood upon reference to Fig. 1. The tube 3 may then be withdrawn from the body 11, the balls riding out of the groove 6 a sufficient distance to clear the same and being accommodated in such outward movement by the flared or beveled end of the locking sleeve 17. The escape of the balls from the openings 20, however, will be prevented by the flared end of the locking sleeve, as will be understood.

The fitting 3 is to be permanently secured upon the spring, bearing or other part which is to be lubricated and will always be in proper position. The ball valve 8 is normally seated so that dirt cannot enter the fitting nor can lubricant escape therefrom, and, when seated, the ball will project beyond the end of the fitting a slight distance which is sufficient to permit the ball to be fully seated and to be engaged by the opposed surface of the fitting on the grease gun when lubricant is to be inserted into the bearing or other part. The body 11, with the parts mounted therein and thereon, is intended to be secured in the delivery nozzle of the grease gun and be left permanently attached thereto and it may be noted, at this point, that the inner ends of the openings 20 are contracted slightly so that while the balls 21 may project therethrough to engage the tube 3 they cannot drop from the openings as said tube is withdrawn.

In assembling the balls, they are inserted through the outer ends of the respective openings before the locking sleeve is engaged upon the body 11. After the balls are placed in position, the locking sleeve is slid forwardly over the body from the rear end of the same, so as to engage over the balls, and the retaining ring 19 is then sprung into engagement with the groove 18 so that the locking sleeve cannot be withdrawn from the body under normal conditions. The grease gun is operated in the usual manner and forces the grease or heavy oil under pressure through the bore 14, past the ball valve 8, which will be unseated by the pressure if it is not already unseated by contact with the washer or gasket 15. The lubricant will then pass through the bore of the tube 3 into the bearing or other part which is to be lubricated. The device is exceedingly simple and inexpensive and its many advantages are thought to be evident without specific mention thereof.

While I have shown and described this invention as a lubricator fitting still it is to be understood that I do not wish to be limited in this respect as the invention is well suited for use in other fields, such for instance as a connection for water hose, air hose, and the like, a connection for tubular couplings, trailer hitches, lifts, draw bar couplings for tractors and trucks, as well as air couplings on railroad cars and, in fact, could be made to apply in most instances where a coupling or connection is needed that can be easily and quickly disconnected.

Having thus described the invention, I claim,

Apparatus of the type set forth comprising a tubular body having an external annular groove near one end, an inwardly opening check valve fitted in said end, a second tubular body having one end adapted to fit around the grooved and valved end of the first mentioned body and provided at said end with radial openings and an external annular flange, the inner face of which is beveled outwardly, balls disposed in said radial openings and adapted to engage the groove in the first mentioned body to hold the bodies together, a locking sleeve slidably mounted on the second mentioned body to extend over the radial openings therein and retain the balls in engagement with the groove in the first mentioned body and having its inner surface at one end thereof beveled to correspond with the beveled face of the annular flange, the ball locking movement of the sleeve being limited by engagement of said beveled faces, and an abutment on said body limiting the ball releasing movement of the sleeve with the beveled end of the sleeve overhanging the radial openings whereby a limited outward movement of the balls within the openings is permitted and withdrawal of said balls prevented.

In testimony whereof I affix my signature.

EUGENE J. MACEY. [L. s.]